(12) United States Patent
Fechner et al.

(10) Patent No.: US 8,004,196 B2
(45) Date of Patent: Aug. 23, 2011

(54) ALKALI-FREE ALUMINOBOROSILICATE GLASSES FOR LIGHTING MEANS WITH EXTERNAL OR INTERNAL CONTACTING

(75) Inventors: Jörg Fechner, Mainz (DE); Franz Ott, Konnersreuth (DE); Christof Kass, Tirschenreuth (DE)

(73) Assignee: Schott AG, Mainz (DE)

( * ) Notice: Subject to any disclaimer, the term of this patent is extended or adjusted under 35 U.S.C. 154(b) by 206 days.

(21) Appl. No.: 12/274,797

(22) Filed: Nov. 20, 2008

(65) Prior Publication Data

US 2009/0129061 A1    May 21, 2009

(30) Foreign Application Priority Data

Nov. 21, 2007  (DE) .......................... 10 2007 055 490
Nov. 7, 2008   (DE) .......................... 10 2008 056 323

(51) Int. Cl.
*H01J 17/16*   (2006.01)
*C03C 3/091*   (2006.01)

(52) U.S. Cl. .......................... 313/636; 501/66; 313/493

(58) Field of Classification Search .................. 313/636, 313/492; 501/66

See application file for complete search history.

(56) References Cited

U.S. PATENT DOCUMENTS 6,858,552 B2 *   2/2005   Peuchert ......................... 501/66

FOREIGN PATENT DOCUMENTS

| DE | 103 06 427 A1 | 10/2003 |
|----|---------------|---------|
| DE | 20 2005 004 459 U1 | 12/2005 |
| DE | 10 2005 000 664 A1 | 11/2006 |
| DE | 10 2006 005 611 A1 | 11/2006 |
| JP | 6417335 A | 1/1989 |
| JP | 7173423 A | 7/1995 |
| JP | 10500072 A | 1/1998 |

OTHER PUBLICATIONS

G. Cho et al., J. Phys. D: Appl. Phys. vol. 37, (2004), pp. 2863-2867.
T.S. Cho et al., Jpn. J. Appl. Phys. vol. 41, (2002), pp. 7518-7521.

* cited by examiner

*Primary Examiner* — Joseph L Williams
(74) *Attorney, Agent, or Firm* — Taylor IP, PC

(57) ABSTRACT

The invention relates to aluminoborosilicate glasses as a glass casing body of a lighting means, especially for background illumination, which glass composition is equally suitable for use in lighting means with external contacting as well as for lighting means with internal contacting.

57 Claims, 4 Drawing Sheets

ALKALI-FREE ALUMINOBOROSILICATE GLASSES FOR LIGHTING MEANS WITH EXTERNAL OR INTERNAL CONTACTING

BACKGROUND OF THE INVENTION

1. Field of the Invention

The invention relates to glasses for use in lighting means, especially in the area of background illuminations.

2. Description of the Related Art

It is known that quite special requirements are placed on the glass and its qualities for background illuminations. This concerns the small dimensions of the lighting means used, the correspondingly extremely low thicknesses as well as the UV-absorbing qualities, in which case the irradiated high-frequency energy should not be absorbed or should be absorbed only to a slight extent by the lamp glass in order, for example, to cause the illuminating gas enclosed in the fluorescent lamp to ignite.

Furthermore, the use of alkali-free glasses as a component of background illuminations is known. For example, utility model DE 20 2005 004 459 teaches alkali-free glasses that are specially adapted for use in lighting means with external electrodes. They are for example, EEFLs (external electrode fluorescent lamps), also designated as electrodeless discharge lamps since there are no electrode lead-throughs but rather only external or outside electrodes.

DE 103 06 427 A1 describes the use of aluminosilicate glasses, especially alkaline-earth aluminosilicate glasses, with a transformation temperature Tg>600° C. for the manufacture of lamp bulbs for discharge lamps. The glass composition includes >55-64 wt. % $SiO_2$, 13-18 wt. % $Al_2O_3$, 0-5.5 wt. % $B_2O_3$, 0-7 wt. % MgO, 5-14 wt. % CaO, 0-8 wt. % SrO, 6-17 wt. % BaO, 0-2 wt. % $ZrO_2$ and 0-5 wt. % $TiO_2$. This glass was developed especially for discharge lamps with external contacting and has a high thermal resistance.

Furthermore, DE 10 2005 000 664 A1 describes the process for adjusting the UV absorption of glasses and glass ceramic materials in which the lowest possible $TiO_2$ content is present in the glass. The glasses are designed in particular for EEFL applications, that is, lighting means with external contacting.

DE 10 2006 005 611 A1 relates to a display with background illumination including lighting means with external electrodes in which the total efficiency of the lighting means is optimized by a purposeful selection of the glass composition.

However, the above-described glasses have very high glass transformation temperatures Tg, for example, Tg>600° C., preferably Tg>700° C. and frequently a high $Al_2O_3$ content in order to achieve a high temperature stability. This high temperature stability is actually not necessary for the use as casing tube of a low-pressure glass discharge lamp and is not favorable in every case in the manufacture of the lamps. Thus, high processing temperatures are required for melting in the electrode lead-throughs and for closing the tubes by melting. This results in a high energy consumption associated with high expenses. Furthermore, the described glasses are suitable for lamps of the EEFL type and are adapted to the thermal expansion behavior of metal/metal alloy of the electrode lead-throughs (longitudinal expansion, CTE), but not to other lamp types, such as, e.g., CCFL.

It is furthermore known that alkali-containing borosilicate glasses specially adapted for only one lamp type are customarily used for CCFL (cold cathode fluorescent lamp) or also EEFL (external electrode fluorescent lamp) gas discharge lamps, which glasses have the advantage that they can be worked at relatively low temperatures and can be adapted very well to the coefficients of expansion of the metals/ alloys of the electrode lead-throughs (e.g., molybdenum, Kovar).

For example, an alkali-containing silicate glass for a fluorescent lamp is known from the state of the art in accordance with JP 01-239037, which glass has the following composition range: 65-75 wt. % $SiO_2$, 0.5-2.5 wt. % $Al_2O_3$, 1.0-5.0 wt. % MgO, 3.0-8.0 wt. % CaO, 5.5-9.5 wt. % MgO+CaO, 13-19 wt. % $Na_2O$, 0-3.0 wt. % $K_2O$, 13.0-20.0 wt. % $Na_2O+K_2O$, 0.3-3 wt. % $B_2O_3$, 0.1-1 wt. % $P_2O_5$, 0.4-0.8 wt. % $Sb_2O_3$ and 0.03-0.05 wt. % $Fe_2O_3$. The glasses have improved transmission and workability as well as a reduction of the manufacturing costs and should be more environmentally friendly.

However, the described alkali-containing glasses have the disadvantageous tendency to the so-called blackening, a darkening of the glass by the reaction of mercury with the alkali components of the glass, especially sodium. Furthermore, these glasses have poor dielectric qualities for use in EEFL applications, which is reflected, for example, in a too high quotient of tan delta/relative permittivity, and therefore signifies a poor efficiency. Furthermore, the puncture strength of the glasses, so-called pinhole stability or pinhole burning, which signifies a puncturing at high voltages, is low.

What is needed in the art is to avoid the disadvantages of the state of the art and to make a glass available that is suitable for meeting the desired requirements in the area of background illuminations to a high degree and which is equally suitable for applications in lighting means with external as well as internal contacting.

SUMMARY OF THE INVENTION

The present invention provides alkali-free aluminoborosilicate glasses for use in lighting means with external or internal contacting, especially in the area of background illuminations. More specifically, the present invention provides the use of alkali-free aluminoborosilicate glasses as glass casing bodies of a lighting means in applications with external or internal contacting of the lighting means, in particular for background illumination, in which the glass compositions are selected from the following compositions:

| | |
|---|---|
| $SiO_2$ is | 50-70 wt. % |
| $B_2O_3$ | 1-15 wt. % preferably 4-15 wt. % |
| $Al_2O_3$ | 1-25 wt. %, preferably 1-<13 wt. %, |
| $P_2O_5$ | 0-20 wt. %, preferably 10-20 wt. %, especially 3-20 wt. %, |
| $\Sigma Na_2O + K_2O$ is | 0-<0.5 wt. %, and |
| MgO | 0-10 wt. %, preferably 0-5 wt. %, |
| CaO | 0-12 wt. %, preferably 0-10 wt. %, |
| SrO | 0-5 wt. % |
| BaO | 0-15 wt. % |
| $TiO_2$ | 0-10 wt. %, preferably >0.1-10 wt. % especially preferably >0.5-10 wt. %, |
| $ZrO_2$ | 0-3 wt. % |
| $CeO_2$ | 0-5 wt. % |
| $Fe_2O_3$ | 0-1 wt. % |
| $WO_3$ | 0-5 wt. % |
| $MoO_3$ | 0-3 wt. % |
| ZnO | 0-5 wt. % |
| $Bi_2O_3$ | 0-5 wt. % |
| $SnO_2$ | 0-2 wt. % | as well as Rh, Hf, Ta, W, Re, Os, Ir, Pt, La, Pr, Nd, Sm, Eu, Gd, Tb, Dy, Ho, Er, Tm, Yb, Lu in oxidic form in contents of 0-5 wt. % and optionally refining agents in customary concentrations, especially selected from chlorides, sulfates, $As_2O_3$ and $Sb_2O_3$, with one and the same glass composition being equally suitable for lighting means with internal contacting and lighting means with external contacting.

Subject matter of the invention is also a backlight (background illumination) lighting means including a glass casing body in which the glass composition is selected from the following compositions with a P2O5 content:

| | |
|---|---|
| $SiO_2$ is | 50-70 wt. % |
| $B_2O_3$ | 1-15 wt. % preferably 4-15 wt. %, |
| $Al_2O_3$ | 1-25 wt. %, preferably 1-<13 wt. %, |
| $P_2O_5$ | >0-20 wt. %, preferably 0.5-20 wt. %, especially 10-20 wt. % and 3-20 wt. %, |
| $\Sigma$ Na2O + K2O is | 0-<0.5 wt. %, and |
| MgO | 0-10 wt. %, preferably 0-5 wt. %, |
| CaO | 0-10 wt. % |
| SrO | 0-5 wt. % |
| BaO | 0-15 wt. %, |
| $TiO_2$ | 0.1-10 wt. %, preferably >0.1-10 especially preferably >0.5-10 wt. %, |
| $ZrO_2$ | 0-3 wt. % |
| $CeO_2$ | 0-5 wt. % |
| $Fe_2O_3$ | 0-1 wt. % |
| $WO_3$ | 0-5 wt. % |
| $MoO_3$ | 0-3 wt. % |
| ZnO | 0-5 wt. % |
| $Bi_2O_3$ | 0-5 wt. % |
| $SnO_2$ | 0-2 wt. % | as well as Rh, Hf, Ta, W, Re, Os, Ir, Pt, La, Pr, Nd, Sm, Eu, Gd, Tb, Dy, Ho, Er, Tm, Yb, Lu in oxidic form in contents of 0-5 wt. % and optionally refining agents in customary concentrations, especially selected from chlorides, sulfates, As2O3 and Sb2O3.

It was now surprisingly found that the above-described disadvantages of the previously used alkali-free glasses as well as of the alkali-containing glasses can be overcome by the use of the alkali-free aluminoborosilicate glasses in accordance with the invention. Counter to the previous attempt in the state of the art, according to which glasses were adapted either for use in lighting means with external contacting or for use in lighting means with internal contacting, the invention has now succeeded in making available glass compositions in an unexpected manner that can be simultaneously used in both areas of use. That is, one and the same glass is equally suitable for both uses. The glasses used in accordance with the invention are therefore suited for lighting means with external contacting as well as for lighting means with internal contacting. This results in superb economic advantages apparent in that the number of glasses produced can be distinctly reduced since the glasses are equally suitable for both uses. In particular, product series produced on a large scale offer a distinct usefulness as a consequence hereof.

The lighting means with external contacting should be, in accordance with the invention, a lighting means in which the operation, for example, the ignition of the lighting means takes place and is controlled from the outside. This can be, for example a lighting means with external electrodes. For example, the lighting means can be a discharge lamp such as a gas discharge lamp, especially a low-pressure discharge lamp. In low-pressure lamps the discrete UV lines are partially converted into visible ones by fluorescent layers. Therefore, the lamp can also be a fluorescent lamp, especially an EEFL, and especially preferably a miniaturized fluorescent lamp.

The lighting means with internal contacting should be, according to the invention, a lighting means in which the operation for example, the ignition of the lighting means takes place and is controlled from the inside. In this case an ignition of the plasma can take place via internal electrodes. This type of ignition is an alternative technology. Such systems are designated, for example, as CCFL systems (cold cathode fluorescent lamp).

For glasses to be used in lighting means with internal or external contacting, completely different qualities are significant, so that it seems inappropriate that one glass composition range is equally suitable for both uses. The fact is, in accordance with the invention, that one and the same glass composition is equally suitable for lighting means with internal contacting, in particular an EEFL use, and for a lighting means with external contacting, in particular a CCFL use.

Thus, glass compositions used in accordance with the invention have a series of advantages in applications and lighting means with external as well as internal contacting.

For example, the glasses used in accordance with the invention have good UV-absorbing qualities and absorb only a small part of the irradiated high-frequency energy, so that the total dissipation loss of a lamp glass, for example, of a lighting means with external electrodes, is reduced to a minimum extent.

The using of the above-described glasses can improve the efficiency in uses with external contacting. The glass compositions for the glass casing body of a lighting means of a background illumination with external electrodes displays an extremely low dissipation loss $P_{loss}$ and therewith a high efficiency. This results from the quotient from the loss angle tan δ and the relative permittivity $\in'$, that should not reach a certain upper limit. The glass composition used in accordance with the invention has a quotient from the loss angle and the relative permittivity that fulfills the following equation:

$$\frac{\tan\delta}{\varepsilon'} < 5 \times 10^{-4}.$$

The quotient is preferably approximately $<4.5\times10^{-4}$, especially preferably $<4.0\times10^{-4}$, in particular $<3\times10^{-4}$, still more preferred $<2.5\times10^{-4}$. Good qualities are also obtained in the range of $0.75\times10^{-4}$ to $2.5\times10^{-4}$. Furthermore, a quotient $<1.0\times10^{-4}$, especially $<0.75\times10^{-4}$ is quite particularly preferred.

The values for tan δ can be indicated in values of $10^{-4}$; then results from this for the quotient $$\frac{\tan\delta[10^{-4}]}{\varepsilon'} < 5.$$

The values for tan δ can also be given as absolute values; then results from this for the quotient $$\frac{\tan\delta}{\varepsilon'} < 5 \times 10^{-4}.$$

Let it be assumed as numerical example:
tan d=0.001 and tan δ[10-4]=10 and $\in'$=4, then, the quotient is $$\frac{\tan\delta[10^{-4}]}{\varepsilon'} = 10:4 = 2.5$$

and $$\frac{\tan\delta}{\varepsilon'} = 0.001:4 = 2.5 \times 10^{-4}.$$

According to the invention glasses with a relatively high relative permittivity ∈' are preferably used for the glass casing body of the lighting means. The relative permittivity at 100 kHz at 25° C. is preferably >3 and even more preferably >4, is in particular in the range of 3.5 to 4.5, is more preferably >5, even more preferably >6, quite particularly preferably >8. According to the invention, glasses with a high polarizability, that is, a relative permittivity ∈'>5, are used with particular preference for the glass casing body.

The dielectric dissipation factor tan δ is preferably a maximum of 120 and preferably less than 100. Dissipation factors below 80 are especially preferred and values below 50 and preferably below 30 are especially suitable. Values below 15 are quite especially preferred, especially a range between 1 and 15. The tan δ values can fluctuate depending on the degree of contamination and the method of manufacture.

It would actually be expected that, given the applied alternating voltage on account of the high relative permittivity and on account of the high loss angle, the electrical energy is converted into heat, so that a high dissipation as well as an extremely high heating of the glass would be expected for their use in particular in fluorescent tubes and gas tube lamps with externally arranged electrodes, that should result in a likewise rapid corrosion of the glass material. However, it turned out that this is surprisingly not the case and that the described glasses are very well suited for such applications. Therefore, what is decisive is not adjusting the individual values of loss angle tan δ and the relative permiittivity ∈' as low as possible independently of one another but rather bringing the two values in a relationship with one another. Actually, the quotient from both parameters constitutes the critical magnitude.

The gas discharge is ignited externally in lighting means with external contacting, especially EEFL applications, while the glass functions as a dielectric in a capacitor. For a simple geometry with planar electrodes on the front surfaces of a closed glass tube the power dissipation (designated in the following as $P_{Verlust}$ or $P_{loss}$) can be approximately described by:

$$P_{Verlost} \approx 2 \cdot \frac{1}{\omega \cdot \varepsilon_0} \cdot \frac{\tan\delta}{\varepsilon'} \cdot \frac{d}{A} \cdot I^2$$

in which:
ω: angular frequency
tan δ: loss angle
∈': relative permittivity
d: capacitor thickness (here: thickness of the glass)
A: electrode surface and
I: current strength
$E_0$: influence constant=8.8542 10-12 As/(Vm).

Accordingly, the total power dissipation of the lighting means is minimized by adjusting the quotient tan δ/∈' in a certain range. Glasses that meet the above equation, according to which the quotient from the loss angle and the relative permittivity is below $5 \times 10^{-4}$, accordingly exhibit an improved efficiency.

The above-described quotient can be purposefully adjusted, for example, in a glass composition of the glass casing body. This takes place, for example, in that highly polarizable elements in oxidic form are inserted into the glass matrix. They are, e.g., the oxides of Rh, Hf, Ta, W, Re, Os, Ir, Pt, La, Pr, Nd, Sm, Eu, Gd, Tb, Dy, Ho, Er, Tm, Yb, and/or Lu.

Another problem of EEFLs is the so-called pinhole burning, that designates a puncture at high voltages. If such a puncture occurs, leaks of the glass are produced. This is described in detail in the passages Cho G. et al., J. Phys. D: Appl. Phys. vol. 37, (2004), pp.2863-2867 and Cho T. S. et al., Jpn. J. Appl. Phys. vol. 41, (2002), pp.7518-7521. It surprisingly turned out that the glass compositions used exhibit no pinhole burning. An undesired puncturing did not occur in the glasses even at a voltage of up to 6 kV. This confirms the suitability of the glasses for being used in the lamp area, in particular in EEFL lamps.

Furthermore, the occurrence of blackening in the glasses used in accordance with the invention is clearly reduced or totally avoided, resulting in a significant reduction of the transmission by the reaction of Hg (mercury) with alkalis, especially sodium, in lighting means with external as well as internal contacting, especially CCFL and EEFL applications.

The glasses used are furthermore suitable for a fusing with a metal or metal alloy suitable as electrode and/or electrode lead-in. This is possible not only with the customarily used metals such as molybdenum, or metal alloys such as KOVAR (Fe—Co—Ni alloy) but also succeeds with other metals such as, for example, tungsten. Also, the glasses can have a thermal longitudinal expansion (so-called CTE) adapted to the thermal expansion behavior of the metal or of the metal alloy by the selection of the composition range for the provided electrode lead-throughs. This is significant in particular for lighting means with internal contacting. In lighting means with external contacting this plays no great part.

Furthermore, a better workability of the glasses results since the glass transformation temperature can be distinctly lowered in comparison to classic "hard glasses", for example to a Tg<700° C., especially preferably a Tg<640° C.

The high phosphorus content of the glasses according to a variant of the invention has the advantage that phosphorus oxide forms long two- or three-dimensional networks that reinforce the glass network in addition to the $SiO_2$ and thus result in improved stability. Furthermore, $P_2O_5$ in combination with $Al_2O_3$, when these components are present in the equal molar ratios, can contribute to an $SiO_2$-like glass network. Consequently, it is especially preferable according to the invention if $P_2O_5$ and $Al_2O_3$ are present in the glass composition in the same molar ratio.

According to an especially preferred embodiment of the invention the glass composition used are selected in particular from:

| | |
|---|---|
| $SiO_2$ is | 52-69 wt. % |
| $B_2O_3$ | 5-15 wt. % |
| $Al_2O_3$ | 1-10 wt. % |
| $P_2O_5$ | 0-20 wt. % |
| MgO | 1-5 wt. % |
| CaO | 1-10 wt. % |
| SrO | 0-5 wt. % |
| BaO | 8-15 wt. % |
| Σ MgO + CaO + SrO + BaO | 10-30 wt. % |
| $TiO_2$ | 0-10 wt. % preferably >0.5-10 wt. %, |
| $ZrO_2$ | 0-3 wt. % |
| $CeO_2$ | 0-5 wt. % |
| $Fe_2O_3$ | 0-1 wt. % |
| $WO_3$ | 0-5 wt. % |
| $MoO_3$ | 0-3 wt. % |
| ZnO | 0-5 wt. % |
| $Bi_2O_3$ | 0-5 wt. % |
| $SnO_2$ | 0-2 wt. % | as well as, except for unavoidable contaminations, free of alkalis, $Li_2O$, $Na_2O$, $K_2O$ and Rh, Hf, Ta, W, Re, Os, Ir, Pt, La, Pr, Nd, Sm, Eu, Gd, Tb, Dy, Ho, Er, Tm, Yb, Lu in oxidic form in contents of 0-5 wt. % as well as optionally refining agents in customary concentrations, especially chlorides, sulfates, $SnO_2$, $As_2O_3$ and $Sb_2O_3$.

According to a further especially preferred embodiment of the invention the glass compositions used in accordance with the invention are selected in particular from:

| | |
|---|---|
| $SiO_2$ is | 52-69 wt. % |
| $B_2O_3$ | 10-14 wt. % |
| $Al_2O_3$ | 1-3 wt. % |
| $P_2O_5$ | 0-20 wt. % |
| MgO | 1-5 wt. % |
| CaO | 1-9 wt. % |
| SrO | 0-3 wt. % |
| BaO | 9-14 wt. % |
| Σ MgO + CaO + SrO + BaO | 14-27 wt. % |
| $TiO_2$ | 0-10 wt. % preferably >0.5-10 wt. %, |
| $ZrO_2$ | 0-3 wt. % |
| $CeO_2$ | 0-5 wt. % |
| $Fe_2O_3$ | 0-1 wt. % |
| $WO_3$ | 0-5 wt. % |
| $MoO_3$ | 0-3 wt. % |
| ZnO | 0-5 wt. % |
| $Bi_2O_3$ | 0-5 wt. % |
| $SnO_2$ | 0-2 wt. % | as well as, except for unavoidable contaminations, free of alkalis, $Li_2O$, $Na_2O$, $K_2O$ and Rh, Hf, Ta, W, Re, Os, Ir, Pt, La, Pr, Nd, Sm, Eu, Gd, Tb, Dy, Ho, Er, Tm, Yb, Lu in oxidic form in contents of 0-5 wt. % as well as optionally refining agents in customary concentrations, especially chlorides, sulfates, $SnO_2$, $As_2O_3$ and $Sb_2O_3$.

According to a further preferred embodiment glasses with low conductivity, in particular those with tan $\delta < 20 \times 10^{-4}$, especially preferably tan $\delta < 1 \times 10^{-4}$, are selected for the glass casing body of the lighting means.

Furthermore, glasses whose UV blocking was adjusted in a desirable manner are used with particular preference for the glass casing body. Thus, the UV blocking in the glasses can be adjusted, for example, by the inclusion of rare-earth- or transition-metal ions in the glass compositions. For example, the following elements can be considered for this purpose: Ti, Ce, W, Nb, Bi, Yb, Fe and/or Ni.

However, it proved to be especially advantageous if the lowest possible amounts of $TiO_2$ are used for the UV blocking of a glass. A particularly preferred UV blocking variant therefore starts from the lowest possible addition of $TiO_2$, that is used in combination with iron oxide. An increasing content of iron oxide generally reduces the transmission in the visible range (caused by the formation of iron-titanium complexes such as, e.g., limenite and the like).

Another preferred variant for improving the UV blocking of a glass is the use of titanium and tungsten. Good results can be achieved even here. However, in this case additions of cerium are to be avoided since they result in a significantly stronger solarization in the visible range. A possible alternative to cerium is, for example, niobium.

For the amounts that can be used, the person skilled in the art can fall back on his basic knowledge in the area of glass technology. Possible amounts are apparent from the examples without being limited to them.

However, the UV blocking can also be adjusted in the form of an internal- or external coating of the glass casing body—an internal—or external coating containing $TiO_2$ is especially suitable.

Another variant of the invention relates to a possible internal coating of the glass casing body for the light conversion of UV or blue light to in sum white light with a fluorescent layer of a solid body powder doped with rare earth ions. This is, for example, a YAG powder doped with, for example Ce, Eu, Tm, Tb, Dy and/or Gd.

However, a doping of the glasses for the light conversion of UV or blue light to in sum white light by fluorescent rare-earth ions and/or transition-metal ions can also be provided. Rare earth ions are selected, for example, from Ce, Eu, Tm, Tb, Dy and/or Gd.

Further modifications of the glasses when used in suitable lighting means are conceivable.

The lighting means with external or internal contacting used in accordance with the invention can be every lighting means known to the person skilled in the art for this purpose. The lighting means can be used in combination with other lighting means, in particular in miniaturized lighting means whose glass casing body substantially contains the described glasses or consists of them. The cross section of the lighting means can be as desired and adapted to the spatial conditions, for example, in the case of a background illumination. Round, oval, rectangular or flat, rectangular cross sections (for example Planon® by Osram) are preferred. Lighting means that have a flat, rectangular cross section are quite especially preferred as background illumination.

The material of the contacts on the glass casing body is not particularly limited; it can preferably be selected from
a) Metal sheeting, for example, from Cu, Al, Ag and the like,
b) Immersion coatings of metal or metal-containing conductive substances,
c) Conductive lacquer, such as, for example, silver-containing conductive lacquer, or
d) Conductive adhesive tape, such as a metallic adhesive tape.

The lighting means with external or internal contacting contains a glass composition in accordance with the invention or consists of it. According to the invention alkali-free aluminoborosilicate glasses are used. They include as main components $SiO_2$, $Al_2O_3$ as well as $B_2O_3$ and, as other component, for example, alkaline-earth oxides such as, e.g., CaO, MgO, SrO and BaO, but alkali oxides such as, e.g., $Li_2O$, $Na_2O$ and $K_2O$ only in the form of unavoidable contaminants.

The base glass customarily contains preferably at least 50 wt. %, preferably at least at least 52 wt. %, and especially preferably at least 55 wt. % SiO2. The highest amount of $SiO_2$ is 70 wt. % $SiO_2$, quite particularly preferably around approximately 65 wt. %. Furthermore, the ranges of 52-69 wt. % and of 55-65 wt. % $SiO_2$ are quite particularly preferred. Glasses with a high $SiO_2$ content are distinguished by a low dielectric dissipation factor tan δ and are therefore suitable in particular for the lighting means used in accordance with the invention with external electrodes such as electrodeless fluorescent lamps when taking into consideration the quotient tan δ/ε'. These glasses are also well-suited in the scope of the invention for CCFL applications.

$B_2O_3$ is present in accordance with the invention in a minimum amount of 1 wt. %, preferably >4 wt. %, more preferably >6 wt. %, quite especially preferably >10 wt. %. The highest amount of $B_2O_3$ is 15 wt. %, but preferably <13 wt. %, more preferably <12 wt. % and quite especially preferably <11 wt. % is present. The $B_2O_3$ content is especially preferably in a range of 10 to 14 wt. %.

According to a preferred embodiment the amount of $Al_2O_3$ is preferably at least 1 wt. %, especially preferably >2 wt. %, quite especially preferably >3 wt. %, especially up to 8 wt. %. However, according to another preferred embodiment the amount of $Al_2O_3$ can be up to 25 wt. %, and more preferably <15 wt. %, especially <13 wt. % is used. The ranges of 1 to 8 wt. % or the ranges from 20 to 25 wt. % are especially preferred. The content can be varied appropriately. In particular, it is preferred if the glass compositions with a high phosphate content also have high aluminum contents. This has the advantage in the case of high aluminum oxide contents that the fusibility of the glass is improved by the addition of high phosphate contents. Furthermore, this lowers the processing temperature of the glass. Another advantage is that in the case of high aluminum oxide contents an especially stabile glass network results that is supported by the presence of relatively high phosphate contents.

The glass compositions are free of alkali oxides except for unavoidable contaminants. In individual instances a content below 0.5 wt. % can be tolerated.

The content of the alkaline-earth oxide CaO is a maximum of 12 wt. %, preferably 10 wt. %; however, in individual instances contents of 9 vt.%, especially 8 wt. % are sufficient. Although the glass used in accordance with the invention can also be free of calcium, the glass in accordance with the invention does usually contain at least 1 wt. % CaO, with contents of at least 2 wt. %, especially at least 3 wt. % being preferred. In practice, a content of 4 wt. % proved to be purposeful. BaO is contained in the glass in a range of 0 to 15 wt. %, and preferably more than 8 wt. %, more preferably more than 9 wt. % and especially more than 10 wt. % is present. The lower limit for MgO is in individual cases 0 wt. %; however, at least 1 wt. % and preferably at least 2 wt. % are preferred. The highest content of MgO in the glass is 10 wt. %, with 5 wt. % and especially 3 wt. % being preferred. SrO can be completely absent in the glass; however, it can preferably be contained in an amount of 1 wt. %, especially at least 2 wt. % and can also be contained up to 5 wt. %.

According to the invention, the sum of all alkaline-earth oxides is preferably 0-30 wt. %, especially 5-25 wt. %, preferably 10-20 wt. %, especially preferably 12-18 wt. %, and quite especially preferably 14-16 wt. %.

In order to adjust the quotient of tan $\delta$ and $\in$ as small as possible in accordance with the invention, the glass composition of the glass casing body contains, for example, highly polarizable elements in oxidic form inserted into the glass matrix. Such highly polarizable elements in oxidic form can be selected from the group consisting of the oxides of Rh, Hf, Ta, W, Re, Os, Ir, Pt, La, Pr, Nd, Sm, Eu, Gd, Tb, Dy, Ho, Er, Tm, Yb and/or Lu. At least one of these oxides is preferably contained in the glass composition. Mixtures of two or more of these oxides can also be present. At least one of these oxides is therefore preferably contained in an amount of >0 to 5 wt. %.

BaO, $Bi_2O_3$ are especially preferably present as well as the rare earth metal oxides lanthanum oxide, gadolinium oxide and/or ytterbium oxide in the glass composition of the glass casing body.

According to a further embodiment of the invention the glass compositions can also have a $P_2O_5$ content in the range of >0 to 20 wt. %, preferably 5 to 20 wt. %, especially preferably 8 to 20 wt. %, quite especially preferably 10 to 20 wt. %. This has the particular advantage that phosphorus oxide forms long two-or three-dimensional networks that reinforce the glass network in addition to the $SiO_2$ and thus result in an improved stability. Furthermore, $P_2O_5$ in combination with $Al_2O_3$ can contribute to a glass network similar to $SiO_2$ if these components are present in equal molar ratios.

The glass of the glass casing body is preferably free of ZnO but can contain an amount of 0.1 wt. % or more up to 5 wt. %. $ZrO_2$ is contained in an amount of 0-5 wt. %, especially 0-3 wt. %, and a highest content of 3 wt. % proved to be sufficient in many instances. In addition, $WO_3$ and $MoO_3$ can also be contained independently of one another in an amount of 0-5 and 0-3 wt. %, preferably 0.1-2.5 wt. %, especially with 1-2 wt. %. The content of $Bi_2O_3$ is preferably 0-5 wt. %.

The glasses can also contain $TiO_2$ in order to adjust the "UV edge" (absorption of UV radiation), although they can also be free of it in principle. The highest content of $TiO_2$ is preferably 10 wt. %, especially at the most 8 wt. %, with at the most 5 wt. % being preferred. A preferred minimum content of $TiO_2$ is 0.5 wt. %. Preferably, at least 80% to 99%, especially 99.9 or 99.99% of the contained $TiO_2$ is present as $Ti^{4+}$. In a few instances $Ti^{4+}$ contents of 99.999% proved to be suitable, in which instances the melt is preferably produced under oxidative conditions. The term oxidative conditions denotes in particular those conditions in which titanium is present in the previously indicated amount as $Ti^{4+}$ or is oxidized to this stage. These oxidative conditions can be readily achieved in the melt, for example, by the addition of nitrates, especially alkaline-earth nitrates. An oxidative melt can also be achieved by blowing in oxygen and/or dry air. Furthermore, it is possible to produce an oxidative melt by an oxidizing burner adjustment, e.g., during the melting of the batch.

As already explained, a desired UV blocking of the glass with a reduced amount of $TiO_2$ at the same time can be achieved in an alternative embodiment of the invention by a combination of titanium and iron or titanium and tungsten.

If the $TiO_2$ contents of the glass composition are >2 wt. % and a batch with a total $Fe_2O_3$ content of >5 ppm is used, the mixture is preferably refined with $As_2O_3$ and fused with nitrate. The addition of nitrate preferably takes place with contents >1 wt. % in order to suppress the coloring of the glass in the visible range (the formation of limenite ($FeTiO_3$) mixed oxide).

Furthermore, a refining with $Sb_2O_3$, $SnO_2$, chlorides and sulfates is also possible. The refining means are each contained in the glass in an amount of 0-2 wt. % and the minimal content is preferably 0.1, in particular 0.2 wt. %. In a preferred embodiment the glass optionally contain slight amounts of $SO_4^{2-}$ of 0-2 wt. %, as well as $Cl^-$ and/or $F^-$ also in an amount of 0-2 wt. % each.

In particular, a discoloration of the glasses upon the addition of $TiO_2$ in amounts of >1 wt. % in the visible wavelength range can be at least partially avoided in that the glass melt is substantially free of chloride and in particular no chloride and/or $Sb_2O_3$ was added for the refining during the glass fusion. It was found that a blue coloring of the glass such as occurs in particular during the use of $TiO_2$ can be avoided if chloride is not used as refining means.

It furthermore turned out that even sulfates such as are used, e.g., as refining means, result, just like the previously cited means, in a discoloration of the glass in the visible wavelength range if the glass contains $TiO_2$. It is then preferable to use no sulfates. According to the invention the maximum sulfate content is 2 wt. %, especially 1 wt. %, and contents of a max. of 0.1 wt. % are preferred. The wavelength range between 380 nm and 780 nm is understood to be the visible wavelength range in the present invention.

Moreover, it was found for the glasses that the previously described disadvantages can be avoided even further if a refining with $As_2O_3$ or $Sb_2O_3$ is carried out under oxidizing conditions. The glass especially preferably contains 0.01-1 wt. % $As_2O_3$ or $Sb_2O_3$ or mixtures of these oxides. Due to the increasing importance of environmental guidelines the refining preferably takes place exclusively with $Sb_2O_3$.

The content of $Fe_2O_3$ is preferably 0-1 wt. % with amounts of 0-0.5 wt. % being more preferred. However, the contents are preferably clearly below this. In as far as iron is contained, it is converted by the oxidizing conditions during the melt, for example, by the use of nitrate-containing raw materials, into its oxidation stage +3, which minimizes the discolorations in the visible wavelength range. $Fe_2O_3$ is preferably contained in the glass in contents <500 ppm. $Fe_2O_3$ is generally present as a contaminant.

The above-cited glass compositions are conceived not only for lighting means with external electrodes in which no melting in of the glass with electrode lead-throughs takes place such as EEFL without electrode lead-throughs but are also suitable for lighting means with internal electrodes in which a melting in of the glass with electrode lead-throughs takes place such as CCFL with electrode lead-throughs.

The processes for producing $SiO_2$-containing glasses are known. The described glasses are suitable in particular for producing flat glass, especially according to the flow process. Furthermore, the glasses are suitable for the production of tubular glass, where the Danner process is preferred. However, the production of tubular glass is also possible according to the Velo process or A-Zug process. It is quite especially suitable for the production of tubes with a diameter of at least 0.5 mm, especially at least 1 mm and an upper boundary of at the most 2 cm, especially at the most 1 cm. Particularly preferred tube diameters are between 2 mm and 5 mm. It turned out that such tubes have a wall thickness of at least 0.05 mm, in particular at least 0.1 mm, with at least 0.2 mm being especially preferred. Maximum walls thicknesses are at the most 1 mm, with wall thicknesses of at the most <0.8 mm and <0.7 mm being preferred.

The described glasses are preferably used for lighting means for the background lighting, for example, of displays, for example, in LCD displays or LCD screens as well as in displays illuminated from the back (passive displays, so-called displays with a backlight unit) as light source, such as, e.g., in computer monitors, especially TFF apparatuses as well as in scanners, advertising screens, medical instruments and apparatuses of aviation and space travel as well as of navigation technology, in mobile telephones, pocket calculators and in PDAs (Personal Digital Assistants). The lighting means used have very small dimensions for this usage and the lamp glass accordingly has only an extremely small thickness. Preferred displays as well as screens are so-called flat displays, used in laptops, intermediate space flat backlight arrangements.

A few variants of background illuminations are presented in the following by way of example in which the glasses in accordance with the invention are used.

According to a first variant at least two lighting means are arranged preferably parallel to one another and are preferably located between base or carrier plate and cover or substrate plate or disk. One or more recesses are advantageously provided in the carrier plate in which recesses the lighting means is/are housed. It is preferable if each recess contains one lighting means. The emitted light of the lighting means is reflected on the display or screen.

A reflection layer is advantageously applied on the reflecting carrier plate in accordance with this variant, i.e. in particular in the recess or recesses which reflection layer uniformly scatters the light radiated by the lighting means in the direction of the carrier plate as a type of reflector and thus ensures a homogeneous illumination of the display or screen.

Any plates or disks customary for this purpose can be used as substrate plate or cover plate or disk that functions according to the system design and intended use as light distribution unit or only as covering. The substrate or cover plate or disk can accordingly be, for example, a turbid diffuser disk or a clear transparent disk.

According to a second variant the lighting means can be arranged, for example, outside of the light distribution unit. Thus, the lighting means can be applied, for example, on the outside of a display or screen in which case the light is then advantageously decoupled by a light-transporting plate, a so-called LPG (light guide plate) uniformly over the display or screen. Such light-transporting plates have, for example, a rough surface via which the light is decoupled.

According to a third variant of a background illumination the light-producing unit includes, for example, an enclosed space delimited above by a preferably structured disk, and below by a carrier disk as well as on the sides by walls. By way of example the lighting means such as fluorescent lamps are located on the sides of the unit. This enclosed space can be subdivided, for example, further into individual radiation spaces that can contain a luminescent discharge substance that is applied, for example, in a predetermined thickness on a carrier disk. A turbid diffuser disk or a clear transparent disk or the like can be used as cover plate or cover disk again, depending on the system design.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

DETAILED DESCRIPTION OF THE INVENTION

Figure 1:
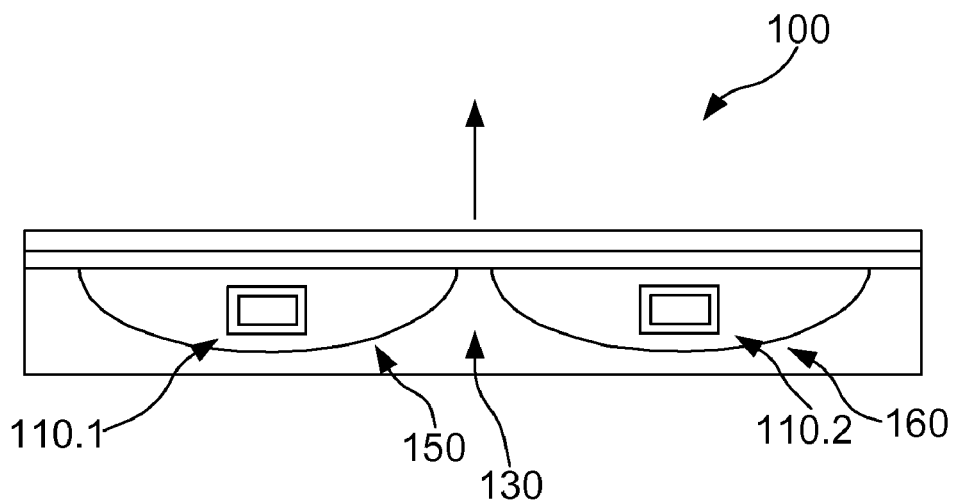
FIG. 1 shows an exemplary schematic view of an embodiment of a background illumination including lighting means with the glass composition in accordance with the invention in miniaturized form.
Figure 2:
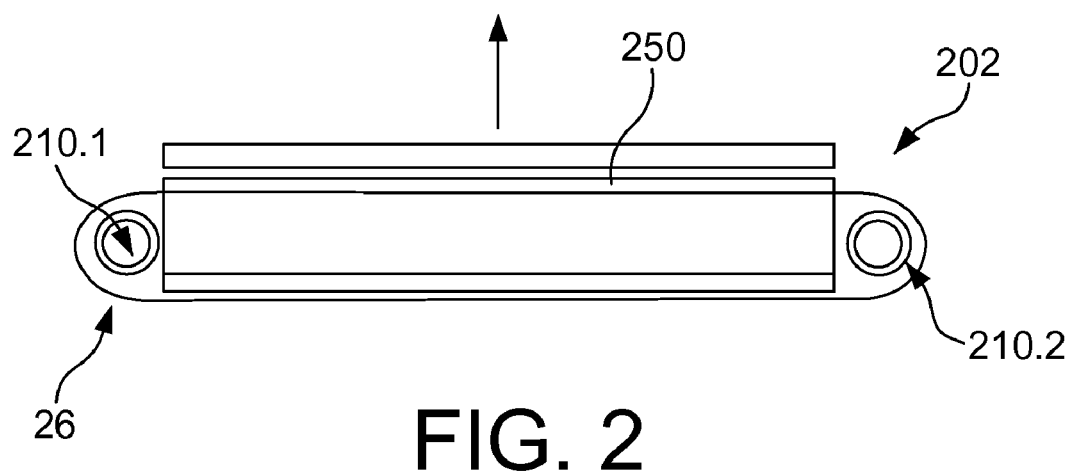
FIG. 2 shows an exemplary schematic view of another embodiment of a background illumination including lighting means with the glass composition in accordance with the invention in miniaturized form.

Referring now to the drawings, and more particularly to FIGS. 1 and 2, there is shown an exemplary schematic view of two embodiments of background illuminations including lighting means with the glass composition in accordance with the invention in miniaturized form.

FIG. 1 shows an exemplary use in the form of a background illumination 100 with two individual miniaturized fluorescent tubes provided as lighting means 110.1, 110.2. The glass casing bodies of lighting means 110.1 and 110.2 contain or consist of a glass composition from the composition range of the glasses that can be used in accordance with the invention. The cross section of lighting means 110.1 and 110.2 used is not particularly limited and is a function of the particular design and purpose of the background illumination. FIG. 1 shows rectangular cross sections by way of example. Of course, even other cross sections can be used. Lighting means 110.1 and 110.2 are present parallel to one another and preferably have the same dimensions.

Lighting means 110.1 and 110.2 can be lighting means with external contacting or internal contacting. Lighting means 110.1 and 110.2 shown in FIG. 1 are, for example, electrodeless gas discharge lamps, that is, there are no lead-throughs, but rather only outer or external electrodes. The discharge lamp includes a discharge space filled with discharge substances such as mercury and/or rare-earth ions and/or with xenon. However, for example, even CCFL systems (cold cathode fluorescent lamp) can be used, in which the ignition of the plasma takes place via internal electrodes. The glass that can be used in accordance with the invention is suitable for both applications in the same manner.

The glass of the glass casing body of lighting means 110.1 and 110.2 preferably has a value for the quotient from the loss angle tan δ and the relative permittivity ∈′ that does not exceed the described limit. A glass is preferably selected for the glass casing body of lighting means 110.1 and 110.2, to the extent that a lighting means with external electrodes, such as EEFLs, is used, to which the following applies:

$$\frac{\tan\delta}{\varepsilon'} < 5 \times 10^{-4},$$

with the usage frequencies in the range of 5-200 kilohertz, preferably 10-150 kHz, especially preferably 20-100 kHz. In order to adjust such frequencies, in this instance means for controlling the lighting means with external electrodes, especially EEFL(s), with alternating voltages are preferably present, with preferably alternating voltages in the range of 0.5-10 kV, especially preferably 0.8-6 kV in the frequency range of 5-200 kHz, preferably 10-150 kHz, especially preferably 20-100 kHz provided (that is, outside of the frequencies that, when they stimulate resonantly mechanically oscillations in the system, are audible). These means for controlling the lighting means (not shown) are designed, for example, for sinusoidal signals, but rectangular signals are preferable. The means especially preferably constitute an electronic control unit that produces the desired voltages and signal forms. It can furthermore be advantageous if the electronic control unit is provided with a current limitation.

The glass casing body of lighting means 110.1 and 110.2 preferably contain a filling of a gas selected from Hg gas, noble gas, especially Xe gas or their mixtures. If the lighting means 110.1 and 110.2 used is a high-pressure lamp, the filling gases standing under pressure rise to such high temperatures that a continuous spectrum is produced, or, if Hg and/or Xe gas is contained as filling gas, an additional strong collision broadening of the Hg and/or Xe line spectrum can be present that can be controlled via external electrodes.

Cooling plates (not shown) can be provided for thermal management on lighting means 110.1 and 110.2, especially for their passive cooling. It is customary for active cooling to provide a ventilator and/or a liquid cooling.

Lighting means 110.1 and 110.2 are located in a plate 130 with recesses 150, that reflect the emitted light on a display. A reflection layer 160 is applied above the reflecting plate 130 which layer uniformly scatters the light radiated from lighting means 110.1 and 110.2 in the direction of plate 130 as a type of reflector and thus ensures a homogenous illumination of the display. This arrangement is preferably used for rather large displays such as, e.g., in television sets.

According to the embodiment in FIG. 2 the lighting means, in the case of the example for fluorescent tubes 210.1 and 210.2 can also be externally attached to a display 202 and the light is then decoupled by a light-transporting plate 250, a so-called LPG (light guide plate) functioning as light guide, uniformly over the display.

Figure 3:
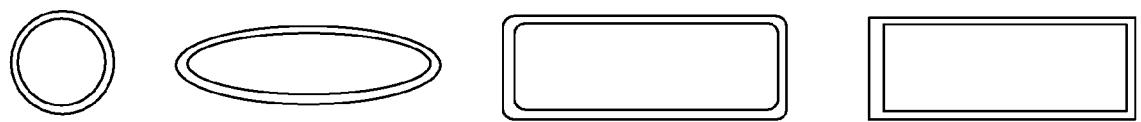
FIG. 3 shows an exemplary schematic view of cross sections of lighting means that can be used in accordance with the invention.

FIG. 3 shows schematic views of exemplary cross sections of lighting means. Thus, e.g., geometries with round, oval, rounded or with rectangular cross section are shown.

FIGS. 1 to 3 illustrate possible embodiments only by way of example. They are not to be understood as being limiting but rather are only examples of possible embodiments. FIGS. 1 to 3 illustrate possible embodiments but are, however, not conclusive and therefore also not limiting as regards the protective scope of lighting means designed in accordance with the invention and their use in background illuminations. Other possibilities for the designing and arranging of the lighting means are conceivable as a function of the desired purpose.

Figure 4:
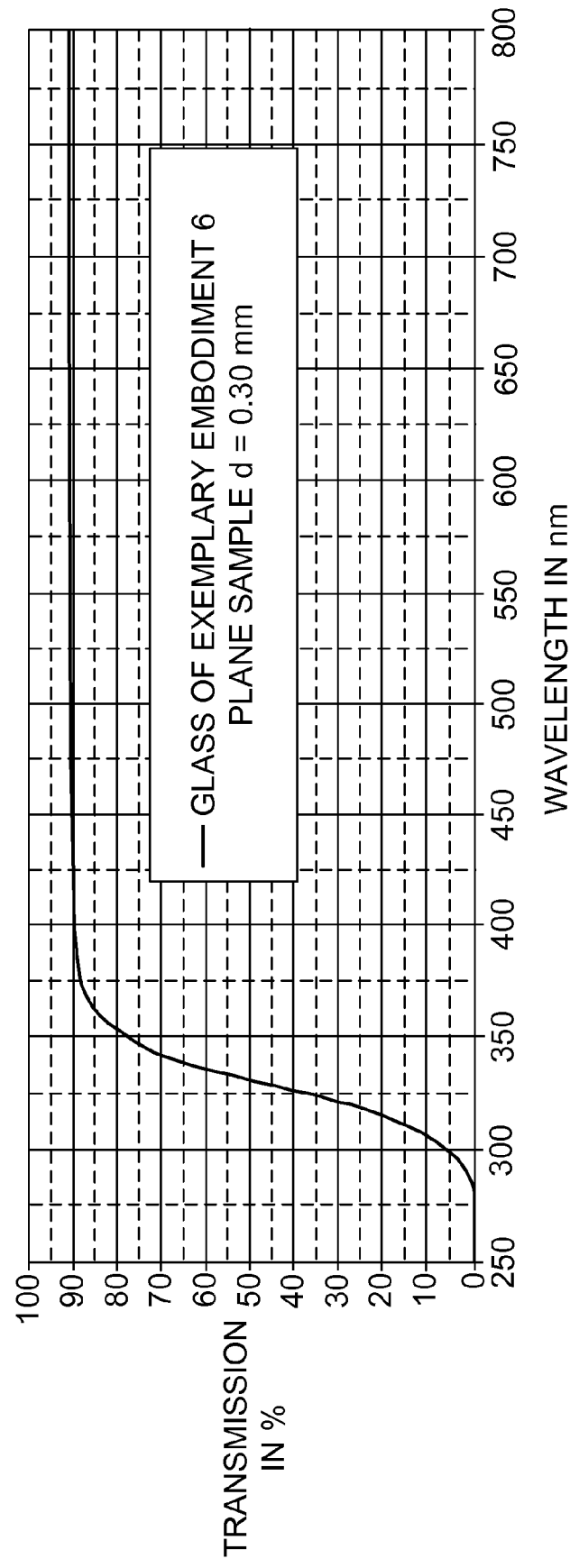
FIG. 4 shows a transmission spectrum of a glass in accordance with the invention.
Figure 5:
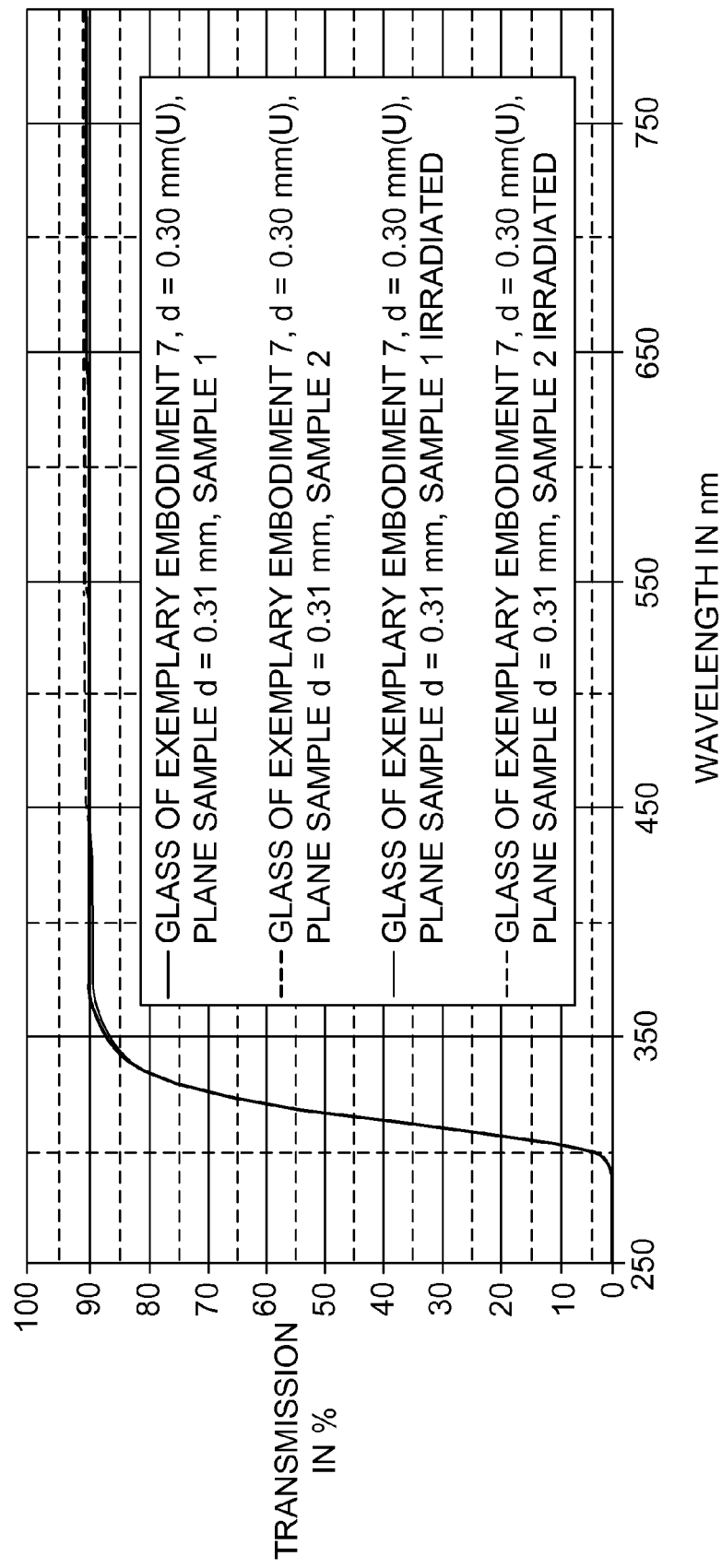
FIG. 5 shows transmission spectra of 4 glasses in accordance with the invention.

FIGS. 4 and 5 are explained in the following examples.

The present invention is explained in the following using examples that illustrate the teaching of the invention but are not intended to limit it.

EXAMPLES

Glass compositions equally suitable for glass casing bodies of lighting means with external or internal electrodes are shown in the following table in which the thermal coefficient of expansion ("alpha" or CTZE), the glass transformation temperature Tg and the density are given. Furthermore, T xx designates the temperature (° C.) at a viscosity of $10^{xx}$ dPas.

Exemplary Embodiments 1 to 5

|  | Emb. 1 | Emb. 2 | Emb. 3 | Emb. 4 | Emb. 5 |
| --- | --- | --- | --- | --- | --- |
| $SiO_2$ | 61.45 | 66.70 | 65.60 | 65.40 | 52.00 |
| $Al_2O_3$ | 2.30 | 2.00 | 2.20 | 7.80 | 22.00 |
| $B_2O_3$ | 11.25 | 5.50 | 12.80 | 5.50 | 1.60 |
| MgO | 3.20 | 3.70 | 4.00 | 4.00 | 7.50 |
| CaO | 7.35 | 7.90 | 2.10 | 2.00 | 7.20 |
| SrO | 2.45 | 2.30 | 2.20 | 0.30 | — |
| BaO | 12.00 | 11.90 | 11.20 | 15.00 | 1.75 |
| $P_2O_5$ | — | — | — | — | 7.80 |
| Sum | 100.00 | 100.00 | 100.10 | 100.00 | 100.00 |
| Alpha | 4.95 | 5.00 | 3.99 | 4.00 | 4.1 |
| Tg | 613 | 653 | 620 | 690 | 740 |
| Density | 2.6589 | 2.6909 | 2.5575 | 2.6565 |  |
| T14.5 | 611 | 636 | 627 | 671 |  |
| T13 | 630 | 667 | 645 | 707 | 730 |
| T7.6 | 867 | 911 | 890 | 955 | 950 |
| T4 | 1205 | 1264 | 1268 | 1322 | 1235 |
| T3 | 1388 | 1452 | 1428 | 1292 |  |
| T2 | 1596 | 1642 | 1677 | 1691 |  | alpha (CTE) . . . Longitudinal extension in $10^{-6}$/K

Exemplary Embodiment 6

The target was to produce a glass with the lowest possible $TiO_2$ content and yet obtain satisfactory UV blocking. The combination of titanium and iron was found to be especially advantageous for UV blocking. The following glass composition was therefore produced:

| $SiO_2$ | 55.47 wt. % |
| --- | --- |
| $B_2O_3$ | 7.65 wt. % |
| $Al_2O_3$ | 13.50 wt. % |
| MgO | 2.45 wt. % |
| CaO | 10.00 wt. % |

-continued

| | |
|---|---|
| BaO | 9.20 wt. % |
| TiO₂ | 1.50 wt. % |
| CeO₂ | 0.20 wt. % |
| Fe₂O₃ | 0.03 wt. % |

The processing temperature of the glass was approximately 1185° C.; good devitrification qualities were present. The glass could be melted and refined very well (1550° C.). FIG. 4 shows the transmission spectrum of this glass.

Even this glass composition in accordance with the invention is likewise suitable for lighting means with external or internal electrodes.

Exemplary Embodiment 7

The target was to produce a glass with the lowest possible $TiO_2$ content and yet obtain satisfactory UV blocking. The combination of titanium and tungsten was found to be especially advantageous for UV blocking. Cerium should be entirely avoided on account of the reinforced solarization in the visible range in the presence of tungsten. Therefore, the following glass composition was produced:

| | |
|---|---|
| SiO₂ | 53.00 wt. % |
| B₂O₃ | 8.50 wt. % |
| Al₂O₃ | 13.00 wt. % |
| MgO | 2.70 wt. % |
| CaO | 10.30 wt. % |
| BaO | 9.00 wt. % |
| TiO₂ | 2.00 wt. % |
| WO3 | 1.50 wt. % |

4 samples of this glass were produced of which 2 were irradiated and 2 not irradiated and their transmission spectra recorded. The irradiation took place with a UV lamp Philips HOK for 15 h. The transmission spectra of the glasses are shown in FIG. 5.

In the figures, d indicates the wall thickness of the glass.

Even this glass composition in accordance with the invention is likewise suitable for lighting means with external or internal electrodes.

Thus, the present invention describes for the first time a glass composition range whose glasses have an especially high puncture strength (pinhole stability), a low blackening (no reaction of the glass with mercury) as well as the possibility of being used for lighting means with internal contacting as well as for lighting means with external contacting. This flexibility of use establishes excellent economic advantages since the number of glasses to be produced can be significantly reduced.

What is claimed is:

1. A method of using glass for a lighting device for a background illumination, said method comprising the steps of:

providing that the glass is an alkali-free aluminoborosilicate glass;

using the glass as a glass casing body of the lighting device in applications with one of external and internal contacting of the lighting device for the background illumination; and selecting a glass composition of the glass from the following compositions:

| | |
|---|---|
| SiO₂ is | 50-70 wt. % |
| B₂O₃ | 1-15 wt. % |
| Al₂O₃ | 1-25 wt. % |
| P₂O₅ | >0-20 wt. % |
| Σ Na₂O + K₂O is | 0-<0.5 wt. % |
| MgO | 0-10 wt. % |
| CaO | 0-12 wt. % |
| SrO | 0-5 wt. % |
| BaO | 0-15 wt. % |
| TiO₂ | 0-10 wt. % |
| ZrO₂ | 0-3 wt. % |
| CeO₂ | 0-5 wt. % |
| Fe₂O₃ | 0-1 wt. % |
| WO₃ | 0-5 wt. % |
| MoO₃ | 0-3 wt. % |
| ZnO | 0-5 wt. % |
| Bi₂O₃ | 0-5 wt. % |
| SnO₂ | 0-2 wt. % | as well as Rh, Hf, Ta, W, Re, Os, Ir, Pt, La, Pr, Nd, Sm, Eu, Gd, Tb, Dy, Ho, Er, Tm, Yb, Lu in oxidic form in contents of 0-5 wt. %, and at least one refining agent selected from chlorides, sulfates, $As_2O_3$ and $Sb_2O_3$, with said glass composition being equally suitable for the lighting device with internal contacting and the lighting device with external contacting.

2. The method of claim 1, wherein the lighting device with external contacting is an external electrode fluorescent lamp, and the lighting device with internal contacting is a cold cathode fluorescent lamp.

3. The method of claim 1, wherein said glass composition has a quotient from a loss angle and a relative permittivity that fulfills the following equation:

$$\frac{\tan\delta}{\varepsilon'} < 5 \times 10^{-4}.$$

4. The method of claim 1, wherein said glass composition has a quotient from a loss angle and a relative permittivity that fulfills the following equation: $(\tan\delta/\varepsilon') < 3 \times 10^{-4}$.

5. The method of claim 1, wherein said glass composition has a quotient from a loss angle and a relative permittivity that fulfills the following equation: $(\tan\delta/\varepsilon') < 2.5 \times 10^{-4}$.

6. The method of claim 1, wherein said glass composition has a quotient from a loss angle and a relative permittivity that fulfills the following equation: $(\tan\delta/\varepsilon') < 2.0 \times 10^{-4}$.

7. The method of claim 1, wherein said glass composition has a quotient from a loss angle and a relative permittivity that fulfills the following equation: $(\tan\delta/\varepsilon') < 1.5 \times 10^{-4}$.

8. The method of claim 1, wherein said glass composition has a quotient from a loss angle and a relative permittivity that fulfills the following equation: $(\tan\delta/\varepsilon') < 1.0 \times 10^{-4}$.

9. The method of claim 1, wherein said glass composition is selected from the following compositions:

| | |
|---|---|
| SiO₂ | 52-69 wt. % |
| B₂O₃ | 5-15 wt. % |
| Al₂O₃ | 1-10 wt. % |
| P₂O₅ | 0.5-20 wt. % |
| MgO | 1-5 wt. % |
| CaO | 1-10 wt. % |

-continued

| | |
|---|---|
| SrO | 0-5 wt. % |
| BaO | 8-15 wt. % |
| Σ MgO + CaO + SrO + BaO | 10-30 wt. % |
| $TiO_2$ | 0-10 wt. % |
| $ZrO_2$ | 0-3 wt. % |
| $CeO_2$ | 0-5 wt. % |
| $Fe_2O_3$ | 0-1 wt. % |
| $WO_3$ | 0-5 wt. % |
| $MoO_3$ | 0-3 wt. % |
| ZnO | 0-5 wt. % |
| $Bi_2O_3$ | 0-5 wt. % |
| $SnO_2$ | 0-2 wt. % | as well as, except for unavoidable contaminations, free of alkalis, $Li_2O$, $Na_2O$, $K_2O$ and Rh, Hf, Ta, W, Re, Os, Ir, Pt, La, Pr, Nd, Sm, Eu, Gd, Tb, Dy, Ho, Er, Tm, Yb, Lu in oxidic form in contents of 0-5 wt. %,
and at least one refining agent selected from chlorides, sulfates, $As_2O_3$ and $Sb_2O_3$.

10. The method of claim 1, wherein said glass composition is selected from the following compositions:

| | |
|---|---|
| $SiO_2$ | 52-69 wt. % |
| $B_2O_3$ | 10-14 wt. % |
| $Al_2O_3$ | 1-3 wt. % |
| $P_2O_5$ | 0.5-20 wt. % |
| MgO | 1-5 wt. % |
| CaO | 1-9 wt. % |
| SrO | 0-3 wt. % |
| BaO | 9-14 wt. % |
| Σ MgO + CaO + SrO + BaO | 14-27 wt. % |
| $TiO_2$ | 0-10 wt. % |
| $ZrO_2$ | 0-3 wt. % |
| $CeO_2$ | 0-5 wt. % |
| $Fe_2O_3$ | 0-1 wt. % |
| $WO_3$ | 0-5 wt. % |
| $MoO_3$ | 0-3 wt. % |
| ZnO | 0-5 wt. % |
| $Bi_2O_3$ | 0-5 wt. % |
| $SnO_2$ | 0-2 wt. % | as well as, except for unavoidable contaminations, free of alkalis, $Li_2O$, $Na_2O$, $K_2O$ and Rh, Hf, Ta, W, Re, Os, Ir, Pt, La, Pr, Nd, Sm, Eu, Gd, Tb, Dy, Ho, Er, Tm, Yb, Lu in oxidic form in contents of 0-5 wt. %,
and at least one refining agent selected from chlorides, sulfates, $As_2O_3$ and $Sb_2O_3$.

11. The method of claim 1, wherein the glass of said glass casing body of the lighting device has a glass transformation temperature Tg<700° C.

12. The method of claim 1, wherein the glass of said glass casing body of the lighting device has a glass transformation temperature Tg<640° C.

13. The method of claim 1, wherein the glass of said glass casing body of the lighting device has an $Al_2O_3$ content one of in a range of 1 to 8 wt. % and in a range of 20 to 25 wt. %.

14. The method of claim 1, wherein $P_2O_5$ and $Al_2O_3$ are present in said glass composition in a same molar ratio.

15. The method of claim 1, wherein the glass of said glass casing body of the lighting device has a $P_2O_5$ content in a range of 1 to 20 wt. %.

16. The method of claim 1, wherein the glass of said glass casing body of the lighting device has a $P_2O_5$ content in a range of 5 to 20 wt. %.

17. The method of claim 1, wherein the glass of said glass casing body of the lighting device has a $P_2O_5$ content in a range of 10 to 20 wt. %.

18. The method of claim 1, wherein the glass used for said glass casing body is selected from a plurality of glasses with a high polarizability, wherein said relative permittivity $\in' >5$.

19. The method of claim 1, wherein the glass used for said glass casing body is selected from a plurality of glasses with low conductivity, with tan $\delta < 20 \times 10^{-4}$.

20. The method of claim 1, wherein the glass used for said glass casing body is selected from a plurality of glasses with low conductivity, with tan $\delta < 1 \times 10^{-4}$.

21. The method of claim 1, wherein the glass used for said glass casing body is selected from a plurality of glasses with UV blocking, which UV blocking is achieved in the glass one of (a) by including one of rare-earth ions and transition-metal ions selected from Ti, Ce, W, Nb, Bi, Yb, Fe, Ni in a glass matrix and (b) by providing an internal or external coating of said glass casing body of the lighting device.

22. The method of claim 21, wherein said UV blocking in said glass is achieved by including a combination of one of (a) titanium and iron and (b) titanium and tungsten in said glass matrix, and if tungsten is present in said glass composition then no cerium is present.

23. The method of claim 1, wherein the lighting device is a high-pressure lamp in which one of a filling gas and a plurality of filling gases standing under pressure rise to such high temperatures that a continuous spectrum is produced, or, if at least one of Hg and Xe gas is contained as one of said filling gas and said plurality of filling gases, an additional strong collision broadening of at least one of said Hg and said Xe line spectrum is present that can be controlled via a plurality of external electrodes.

24. The method of claim 1, wherein the lighting device is a discharge lamp.

25. The method of claim 1, wherein the lighting device is a low-pressure discharge lamp.

26. The method of claim 1, wherein the background illumination is selected from screen applications and display applications, said screen applications and display applications including liquid crystal displays in computer monitors, thin film transistor apparatuses, telephone displays including mobile telephones, scanners, advertising screens, medical instruments, and apparatuses of aviation and space travel and of navigation technology, in pocket calculators, and in Personal Digital Assistants.

27. A backlight lighting device, comprising:
a glass casing body including a glass with a glass composition which is selected from the following compositions:

| | |
|---|---|
| $SiO_2$ | 50-70 wt. % |
| $B_2O_3$ | 1-15 wt. % |
| $Al_2O_3$ | 1-25 wt. % |
| $P_2O_5$ | >0-20 wt. % |
| Σ $Na_2O$ + $K_2O$ is | 0-<0.5 wt. % |
| MgO | 0-10 wt. % |
| CaO | 0-10 wt. % |
| SrO | 0-5 wt. % |
| BaO | 0-15 wt. %, |
| $TiO_2$ | 0.1-10 wt. % |
| $ZrO_2$ | 0-3 wt. % |
| $CeO_2$ | 0-5 wt. % |
| $Fe_2O_3$ | 0-1 wt. % |
| $WO_3$ | 0-5 wt. % |
| $MoO_3$ | 0-3 wt. % |
| ZnO | 0-5 wt. % |
| $Bi_2O_3$ | 0-5 wt. % |
| $SnO_2$ | 0-2 wt. % | as well as Rh, Hf, Ta, W, Re, Os, Ir, Pt, La, Pr, Nd, Sm, Eu, Gd, Tb, Dy, Ho, Er, Tm, Yb, Lu in oxidic form in contents of 0-5 wt. %,
and at least one refining agent selected from chlorides, sulfates, $As_2O_3$, $Sb_2O_3$ and $SnO_2$.

28. The backlight lighting device of claim 27, wherein said glass of said glass casing body of the backlight lighting device has a glass transformation temperature Tg<700° C.

29. The backlight lighting device of claim 27, wherein said glass of said glass casing body of the backlight lighting device has a glass transformation temperature Tg<640° C.

30. The backlight lighting device of claim 27, wherein said glass of said glass casing body of the backlight lighting device has an $Al_2O_3$ content one of in a range of 1 to 8 wt. % and in a range of 20 to 25 wt. %.

31. The backlight lighting device of claim 27, wherein $P_2O_3$ and $Al_2O_3$ are present in said glass composition in a same molar ratio.

32. The backlight lighting device of claim 27, wherein said glass composition has a quotient from a loss angle and a relative permittivity that fulfills the following equation:

$$\frac{\tan\delta}{\varepsilon'} < 5\times 10^{-4}.$$

33. The backlight lighting device of claim 27, wherein said glass composition has a quotient from a loss angle and a relative permittivity that fulfills the following equation: (tan $\delta/\varepsilon')<3\times10^{-4}$.

34. The backlight lighting device of claim 27, wherein said glass composition has a quotient from a loss angle and a relative permittivity that fulfills the following equation: (tan $\delta/\varepsilon')<2.5\times10^{-4}$.

35. The backlight lighting device of claim 27, wherein said glass composition has a quotient from a loss angle and a relative permittivity that fulfills the following equation: (tan $\delta/\varepsilon')<2.0$.

36. The backlight lighting device of claim 27, wherein said glass composition has a quotient from a loss angle and a relative permittivity that fulfills the following equation: (tan $\delta/\varepsilon')<1.5\times10^{-4}$.

37. The backlight lighting device of claim 27, wherein said glass composition has a quotient from a loss angle and a relative permittivity that fulfills the following equation: (tan $\delta/\varepsilon')<1.0$.

38. The backlight lighting device of claim 27, wherein said glass of said glass casing body is selected from a plurality of glasses with a high polarizability, wherein said relative permittivity $\varepsilon'>5$.

39. The backlight lighting device of claim 27, wherein said glass of said glass casing body is selected from a plurality of glasses with low conductivity, with tan $\delta<20\times10^{-4}$.

40. The backlight lighting device of claim 27, wherein the glass of said glass casing body is selected from a plurality of glasses with low conductivity, with tan $\delta<1\times10^{-4}$.

41. The backlight lighting device of claim 27, wherein said glass of said glass casing body is selected from a plurality of glasses with UV blocking, which UV blocking is achieved one of (a) by including one of rare-earth ions and transition-metal ions selected from Ti, Ce, W, Nb, Bi, Yb, Fe, Ni in a glass matrix of said glass and (b) by providing an internal or external coating of said glass casing body of the backlight lighting device.

42. The backlight lighting device of claim 41, wherein said UV blocking in said glass is achieved by including a combination of one of (a) titanium and iron and (b) titanium and tungsten in said glass matrix, and if tungsten is present in said glass composition then no cerium is present.

43. The backlight lighting device of claim 27, wherein the backlight lighting device is a discharge lamp.

44. The backlight lighting device of claim 27, wherein the backlight lighting device is a low-pressure discharge lamp.

45. The backlight lighting device of claim 1, wherein said $B_2O_3$ is between 4-15 wt %.

46. The backlight lighting device of claim 1, wherein said $Al_2O_3$ is between 1-<13 wt %.

47. The backlight lighting device of claim 1, wherein said $P_2O_5$ is between 10-20 wt %.

48. The backlight lighting device of claim 47, wherein said $P_2O_5$ is between 3-20 wt %.

49. The backlight lighting device of claim 1, wherein said MgO is between 05 wt %.

50. The backlight lighting device of claim 1, wherein said CaO is between 0-10 wt %.

51. The backlight lighting device of claim 1, wherein said $TiO_2$ is between >0.5-10 wt %.

52. The backlight lighting device of claim 9, wherein said $TiO_2$ is between >0.5-10 wt %.

53. The backlight lighting device of claim 10, wherein said $TiO_2$ is between >0.5-10 wt %.

54. The backlight lighting device according to claim 27, wherein said $B_2O_3$ is between 4-15 wt %.

55. The backlight lighting device according to claim 27, wherein said $P_2O_5$ is between 10-20 wt %.

56. The backlight lighting device according to claim 27, wherein said $TiO_2$ is between >0.5-10 wt %.

57. A method of using glass for a lighting device for a background illumination, said method comprising the steps of:
providing that the glass is an alkali-free aluminoborosilicate glass;
using the glass as a glass casing body of the lighting device in applications with one of external and internal contacting of the lighting device for the background illumination; and
selecting a glass composition of the glass from the following compositions:

| | |
|---|---|
| $SiO_2$ is | 50-70 wt. % |
| $B_2O_3$ | 1-15 wt. % |
| $Al_2O_3$ | 1-25 wt. % |
| $P_2O_5$ | 0-20 wt. % |
| $\Sigma Na_2O + K_2O$ is | 0-<0.5 wt. % |
| MgO | 0-10 wt. % |
| CaO | 0-12 wt. % |
| SrO | 0-5 wt. % |
| BaO | 0-15 wt. % |
| $TiO_2$ | 0-10 wt. % |
| $ZrO_2$ | 0-3 wt. % |
| $CeO_2$ | 0-5 wt. % |
| $Fe_2O_3$ | 0-1 wt. % |
| $WO_3$ | 0-5 wt. % |
| $MoO_3$ | 0-3 wt. % |
| ZnO | 0-5 wt. % |
| $Bi_2O_3$ | 0-5 wt. % |
| $SnO_2$ | 0-2 wt. % | as well as Rh, Hf, Ta, W, Re, Os, Jr, Pt, La, Pr, Nd, Sm, Eu, Gd, Tb, Dy, Ho, Er, Tm, Yb, Lu in oxidic form in contents of 0-5 wt. %,
and at least one refining agent selected from chlorides, sulfates, $As_2O_3$ and $Sb_2O_3$, with said glass composition being equally suitable for the lighting device with internal contacting and the lighting device with external contacting,
wherein said $P_2O_5$ and said $Al_2O_3$ are present in said glass composition in a molar ratio that is the same.

* * * * *

UNITED STATES PATENT AND TRADEMARK OFFICE
CERTIFICATE OF CORRECTION

PATENT NO. : 8,004,196 B2
APPLICATION NO. : 12/274797
DATED : August 23, 2011
INVENTOR(S) : Jörg Fechner et al.

Page 1 of 1

It is certified that error appears in the above-identified patent and that said Letters Patent is hereby corrected as shown below:

COLUMN 20
At line 10, please delete "05 wt %", and substitute therefore --0-5 wt %--; and
At line 55, please delete "Jr," and substitute therefore --Ir,--.

Signed and Sealed this
Tenth Day of April, 2012

David J. Kappos
*Director of the United States Patent and Trademark Office*